(12) United States Patent
Takai et al.

(10) Patent No.: US 8,363,329 B2
(45) Date of Patent: Jan. 29, 2013

(54) LIQUID LENS APPARATUS AND MANUFACTURING METHOD OF THE SAME

(75) Inventors: Yuichi Takai, Tokyo (JP); Junichi Ohsako, Tokyo (JP)

(73) Assignee: Sony Corporation, Tokyo (JP)

( * ) Notice: Subject to any disclaimer, the term of this patent is extended or adjusted under 35 U.S.C. 154(b) by 832 days.

(21) Appl. No.: 12/506,604

(22) Filed: Jul. 21, 2009

(65) Prior Publication Data
US 2010/0020407 A1 Jan. 28, 2010

(30) Foreign Application Priority Data

Jul. 28, 2008 (JP) ................. 2008-193640

(51) Int. Cl.
*G02B 3/12* (2006.01)
*G02B 3/14* (2006.01)
(52) U.S. Cl. ...................................................... 359/666
(58) Field of Classification Search ........... 359/665–667
See application file for complete search history.

(56) References Cited

U.S. PATENT DOCUMENTS 7,317,580 B2 * 1/2008 Kogo et al. ................. 359/666
2007/0163875 A1 7/2007 Van Der Meer et al.

FOREIGN PATENT DOCUMENTS

| JP | 2002-147620 | 5/2002 |
|----|-------------|--------|
| JP | 2007-519970 | 7/2007 |
| JP | 2007-536591 | 12/2007 |
| JP | 2008-107826 | 5/2008 |
| JP | 2008-087973 | 7/2008 |
| JP | 2007519970 | 7/2009 |

OTHER PUBLICATIONS

Japanese Office Action for corresponding JP2008-193640 issued on Jul. 20, 2010.
Japanese Office Action for corresponding JP 2008-193640 issued on Apr. 20, 2010.

* cited by examiner

*Primary Examiner* — Scott J Sugarman
(74) *Attorney, Agent, or Firm* — K&L Gates LLP

(57) ABSTRACT

Disclosed is a liquid lens apparatus. The liquid lens apparatus includes a liquid lens element and a fixing jig. The liquid lens element includes a main body, a lens surface, and a sealing portion, the main body including a first substrate, a second substrate, and a third substrate that is disposed between the first substrate and the second substrate and forms a liquid chamber, the lens surface being formed of an interface between two liquids which are contained in the liquid chamber and have different refractive indexes and being capable of being electrically deformed, the sealing portion hermetically sealing the main body. The fixing jig is engaged with the first substrate and the second substrate, the first substrate and the second substrate sandwiching the third substrate.

20 Claims, 7 Drawing Sheets

LIQUID LENS APPARATUS AND MANUFACTURING METHOD OF THE SAME

CROSS REFERENCES TO RELATED APPLICATIONS

The present application claims priority to Japanese Priority Patent Application JP 2008-193640 filed in the Japan Patent Office on Jul. 28, 2008, the entire content of which is hereby incorporated by reference.

BACKGROUND

The present application relates to a liquid lens apparatus using an electrowetting phenomenon, and to a manufacturing method of the same.

A liquid lens using an electrowetting phenomenon has been studied.

A liquid lens has a structure in which a liquid is contained in a lens container. Generally, a liquid lens is constituted of a plurality of members. A liquid lens device is envisioned to be mounted on a portable apparatus such as a camera and a mobile phone because of its low power consumption and reduced size and weight, and is disposed along with an electronic substrate and the like in many cases. That is, it is necessary for a liquid lens to be capable of completely sealing a liquid contained therein (in a long term).

For a liquid lens, various means for sealing a contained liquid have been proposed. For example, Japanese Patent Translation Publication No. 2007-519970 (paragraph 0052, FIG. 9) (hereinafter, referred to as Patent Document 1) discloses a varifocal lens package having a structure in which a plate-shaped lower lens member, a plate-shaped main body having a through hole, and a plate-shaped upper lens member are layered in the stated order, and a chamber for containing a liquid is partitioned by the through hole of the main body, the lower lens member, and the upper lens member.

The varifocal lens package includes a tightening unit for sandwiching and pressing the main body and the upper lens member by elasticity on an outer circumference of the main body and the upper lens member, and another tightening unit for sandwiching and pressing the main body and the lower lens member by elasticity on an outer circumference of the main body and the lower lens member. The two tightening units are alternately disposed so as not to interfere with each other in the outer circumference of the main body.

By those tightening units, the upper lens member is pressed against the main body and the lower lens member is pressed against the main body, that is, the upper lens member and the lower lens member are pressed against the main body.

Between the main body and the upper lens member and between the main body and the lower lens member, sealing rings made of rubber or the like are disposed, respectively. When the upper lens member and the lower lens member are pressed against the main body, the sealing rings are elastically deformed, thereby sealing a liquid.

SUMMARY

However, in the varifocal lens package disclosed in Patent Document 1, the tightening unit for the upper lens member and the main body and the tightening unit for the lower lens unit and the main body are alternately disposed on the outer circumference of the main body as described above, resulting in uneven pressure application to the main body. This may deform the main body, which may affect optical characteristics of the lens or a sealing performance with respect to the liquid contained.

In addition, if the main body is deformed in the varifocal lens package as described above and therefore the liquid leaks from a chamber that contains the liquid, the liquid leaked may reach an outside of the varifocal lens package, because the tightening units each do not have a structure capable of sealing the liquid leaked.

In view of the above-mentioned circumstances, it is desirable to provide a liquid lens apparatus having a high sealing performance with respect to a liquid contained therein.

According to an embodiment, there is provided a liquid lens apparatus including a liquid lens element and a fixing jig.

The liquid lens element includes a main body, a lens surface, and a sealing portion. The main body includes a first substrate, a second substrate, and a third substrate that is disposed between the first substrate and the second substrate and forms a liquid chamber. The lens surface is formed of an interface between two liquids which are contained in the liquid chamber and have different refractive indexes and is capable of being electrically deformed. The sealing portion hermetically seals the main body.

The fixing jig is engaged with the first substrate and the second substrate. The first substrate and the second substrate sandwiches the third substrate.

With this structure, the fixing jig seals the liquid contained in the liquid chamber by sandwiching the first substrate and the second substrate. Therefore, since the fixing jig is not directly engaged with the third substrate, the main body is prevented from being deformed. As a result, it is possible to prevent liquid leakage due to deformation of the main body and provide the liquid lens element with a high sealing performance.

The fixing jig may adjust an inner pressure of the liquid chamber by using an engagement force with respect to the first substrate and the second substrate.

With this structure, by using a pressing force obtained by pressing the first substrate and the second substrate against the third substrate, the inner pressure of the liquid chamber can be adjusted, and the fixing jig that imparts the pressing force can adjust the inner pressure.

The fixing jig may include a first member, a second member, and a bonding means.

The first member has a first holding surface that is in contact with the first substrate and a first bonded surface.

The second member has a second holding surface that is in contact with the second substrate and a second bonded surface.

The bonding means bonds the first bonded surface and the second bonded surface with each other.

With this structure, the fixing jig is formed by bonding the first member and the second member with each other by the bonding means, with the result that the first member and the second member can be separately contacted with the liquid lens element.

The sealing portion may be disposed in at least one of a gap between the first substrate and the third substrate and a gap between the second substrate and the third substrate.

With this structure, when the fixing jig presses the first substrate and the second substrate against the third substrate, the sealing portion is deformed, with the result that the liquid contained in the liquid chamber can be sealed.

The liquid lens apparatus may further include a reinforcing member.

The reinforcing member is disposed in at least one of a gap between the first substrate and the first member and a gap between the second substrate and the second member, and reinforces one of the first substrate and the second substrate.

With this structure, the first substrate or the second substrate can be physically reinforced and can be prevented from being damaged.

The liquid lens apparatus may further include an optical member.

The optical member has an optical characteristic, and is disposed in at least one of a gap between the first substrate and the first member and a gap between the second substrate and the second member.

With this structure, the main body can be provided with the optical characteristic.

The sealing portion may be disposed between the liquid lens element and the fixing jig.

With this structure, when the liquid contained in the liquid chamber leaks from the liquid lens element, the sealing portion can seal the liquid. That is, the liquid can be prevented from leaking from the liquid lens apparatus.

The sealing portion may be disposed on an outer circumference of the third substrate.

With this structure, it is possible to separately adjust the pressing force obtained when the first substrate and the second substrate are pressed against the third substrate and the pressing force for deforming the sealing portion.

The sealing portion may be disposed between the first member and the second member.

With this structure, by using the engagement force of the first member and the second member, the sealing portion can be deformed and the liquid contained in the liquid chamber can be sealed.

The first substrate may include a surface having a three-dimensional structure.

With this structure, the liquid lens apparatus having an additional optical or physical function can be obtained.

According to another embodiment, there is provided a method of manufacturing a liquid lens apparatus. The method includes producing a liquid lens element and determining an inner pressure.

The liquid lens element including a main body and a lens surface is produced. The main body includes a first substrate, a second substrate, and a third substrate that is disposed between the first substrate and the second substrate and forms a liquid chamber, and the lens surface is formed of an interface between two liquids which are contained in the liquid chamber and have different refractive indexes and is capable of being electrically deformed.

A circumference of the liquid lens element is sandwiched by a fixing jig to hermetically seal the liquid lens element, thereby determining an inner pressure thereof.

As described above, according to the embodiments, the liquid lens apparatus having the high sealing performance with respect to the liquid contained therein can be provided.

Additional features and advantages are described herein, and will be apparent from the following Detailed Description and the figures.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

DETAILED DESCRIPTION

Figure 1:
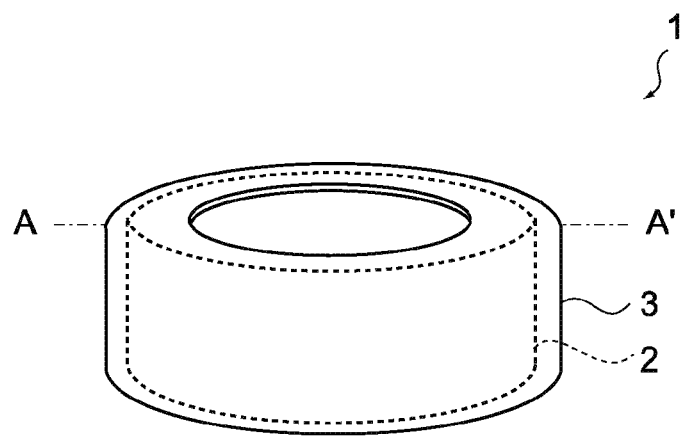
FIG. 1 is a perspective view showing an outline of a liquid lens apparatus according to a first embodiment.

FIG. 1 is a perspective view showing an outline of a liquid lens apparatus 1 according to an embodiment.

Figure 2:
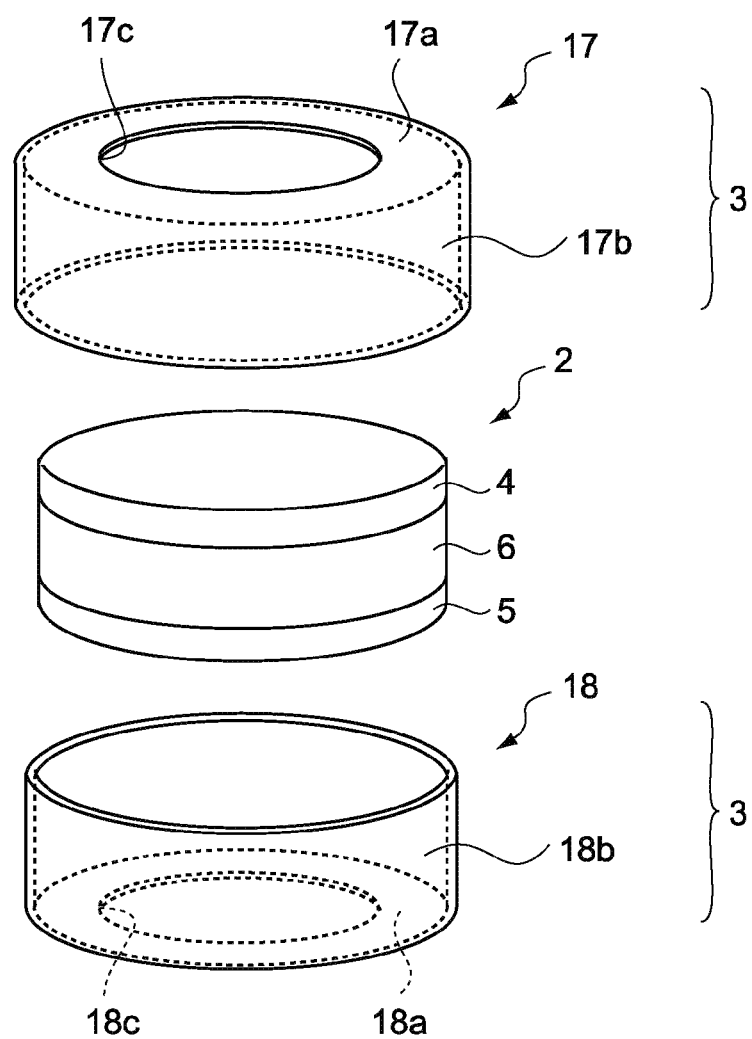
FIG. 2 is a perspective view showing a state where a liquid lens element and a fixing jig of the liquid lens apparatus according to the first embodiment are separated.

FIG. 2 is a perspective view showing a state where a liquid lens element 2 and a fixing jig 3 of the liquid lens apparatus 1 according to an embodiment are separated.

As shown in FIGS. 1 and 2, the liquid lens apparatus 1 includes the liquid lens element 2 and the fixing jig 3.

The fixing jig 3 constituted of a first member 17 and a second member 18 internally holds the liquid lens element 2.

Figure 3:
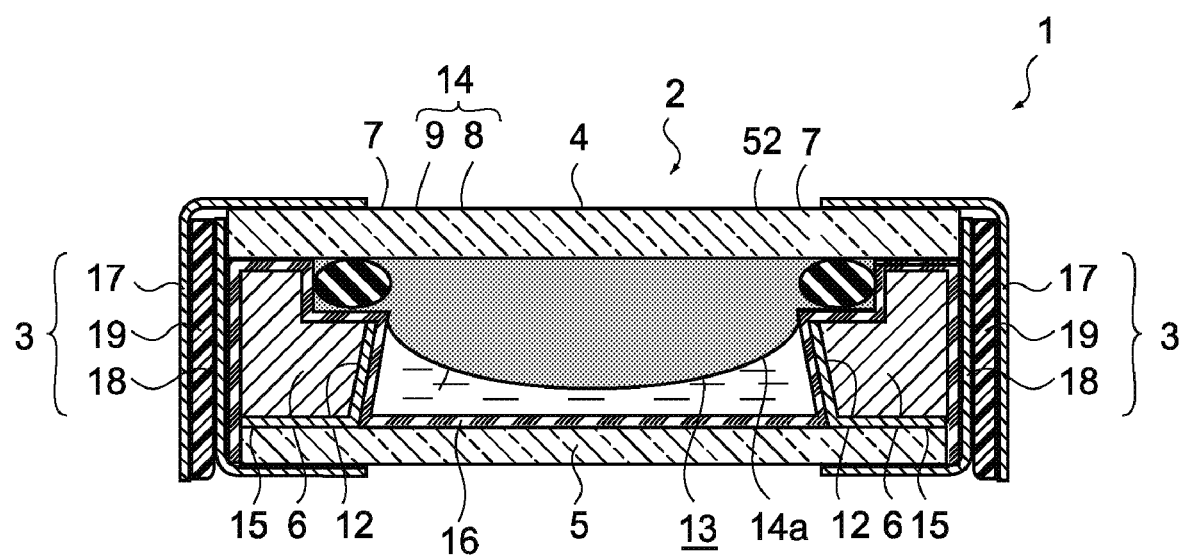
FIG. 3 is a cross-sectional view showing the liquid lens apparatus according to the first embodiment.

FIG. 3 is a cross-sectional view of the liquid lens apparatus 1 according to an embodiment.

Figure 4:
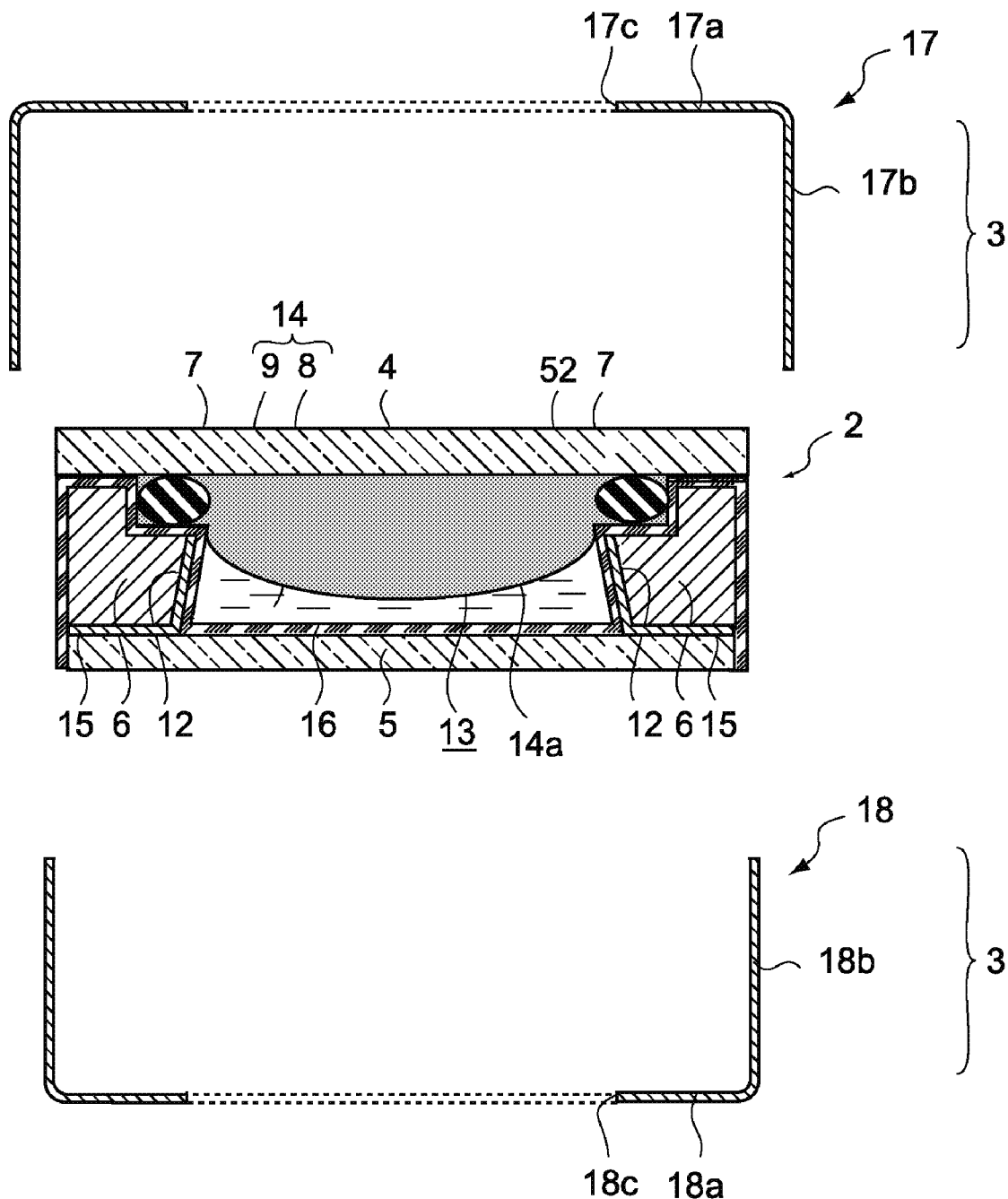
FIG. 4 is a cross-sectional view showing the state where the liquid lens element and the fixing jig of the liquid lens apparatus according to the first embodiment are separated.

FIG. 4 is a cross-sectional diagram showing a state where the liquid lens element 2 and the fixing jig 3 of the liquid lens apparatus 1 according to an embodiment are separated.

FIGS. 3 and 4 each show the cross section of the liquid lens apparatus shown in FIG. 1 taken along the dash-dotted line A-A' of FIG. 1, the cross section being parallel to the page of FIG. 1.

As shown in FIG. 3, on an outer circumference of the liquid lens element 2 excluding an optically effective area (described later), the fixing jig 3 is provided.

As shown in FIG. 3, the first member 17 and the second member 18 are bonded by a bonding member 19.

Hereinafter, the liquid lens element 2 according to this embodiment will be described.

As shown in FIGS. 3 and 4, the liquid lens element 2 includes a first substrate 4, a second substrate 5, a third substrate 6, and a sealing member 7. In the liquid lens element 2, a first liquid 8 and a second liquid 9 (which are collectively expressed as liquid 14) are contained.

In the liquid lens element 2, the first substrate 4, the third substrate 6, and the second substrate 5 are layered in the stated order, and a space formed by a through hole 12 formed in the third substrate 6, the first substrate 4, and the second substrate 5 functions as a liquid containing chamber 13.

The liquid 14 is contained in the liquid containing chamber 13. The sealing member 7 is annular in shape, and is disposed at a position such that the sealing member 7 can seal the liquid 14 in the liquid lens element 2.

The liquid lens element 2 according to this embodiment is allowed to exert optical characteristics because of an electrowetting effect. The structure of the liquid lens element 2 is not limited to the following structure.

The first substrate 4 and the second substrate 5 form the liquid containing chamber 13, and serve as paths of incident light that enters the liquid lens element 2 or exiting light that exits the liquid lens element 2. When the first substrate 4 and the second substrate 5 each are made of a material having high transparency such as glass and an acrylic resin, a loss of an intensity of incident light or exiting light can be reduced. On a surface of the first substrate 4 on the liquid containing chamber 13 side, a wiring 52 that is in contact with the first liquid 8 is formed and connected to an external power source (not shown).

The third substrate 6 functions as a partition wall of the liquid containing chamber 13. The third substrate 6 may have a plurality of through holes 12 formed in an array. The through hole 12 may have a circular, rectangular, polygonal, or annular shape. The third substrate 6 is made of a synthetic resin, a metal, glass, ceramic, or the like. The fixing jig 3 is not engaged with the third substrate 6 according to this embodiment, and therefore may be made of a soft material. On a surface of the third substrate 6 on the liquid containing chamber 13 side (peripheral surface of the liquid containing chamber 13), a conductive layer 15 is formed. As an upper layer of the conductive layer 15, an insulation layer 16 is formed. The conductive layer 15 is connected to an external power source (not shown).

The sealing member 7 is disposed between the third substrate 6 and the first substrate 4. The sealing member 7 may be disposed on a peripheral portion of the through hole 12 of the third substrate 6 or in a groove for the sealing member 7, which is formed separately from the through hole 12. The sealing member 7 may be made of a material such as an elastomer, a metal, and a synthetic resin so that the sealing member 7 can seal the liquid 14. The sealing member 7 may have a cross section of a circular, rectangular, or V shape as appropriate.

The conductive layer 15 is a transparent thin film formed of a tin oxide, an ITO (Indium Tin Oxide), or the like by a sputtering method, for example. The insulation layer 16 is a thin film having water repellency, which is formed of parylene (poly-para-xylylene-based resin), an inorganic material, or the like by a CVD (Chemical Vapor Deposition) method, for example.

The first liquid 8 is a conductive or polar liquid. For the first liquid 8, water, an electrolyte, alcohol, an ambient temperature molten salt, or the like can be used. The first liquid 8 according to this embodiment is a lithium chloride solution (3.36 wt %, absolute refractive index of 1.34).

The second liquid 9 is an insulating nonaqueous liquid. For the second liquid 9, carbohydrate, hydrophobic silicone oil, a fluorine-based material, or the like can be used. The second liquid 9 according to this embodiment is silicone oil (TSF437 manufactured by Momentive Performance Materials, Inc., absolute refractive index of 1.49).

The liquid lens element 2 according to this embodiment is manufactured as follows.

On the third substrate 6, the conductive layer 15 is formed by the sputtering method. Next, the second substrate 5 is bonded to the third substrate 6 by adhesive bonding or the like. On the third substrate 6 and the second substrate 5 that are bonded with each other, the insulation layer 16 is formed by the CVD method.

The second liquid 9 and the first liquid 8 are filled in a concave portion formed by the second substrate 5 and the through hole 12 of the third substrate 6. Next, the first substrate 4 is disposed on the third substrate 6.

The liquid lens element 2 structured as described above operates as follows.

As shown in FIG. 3, the first liquid 8 and the second liquid 9 form a two-liquid interface 14a (lens surface) having, e.g., a curved surface shape by an interfacial tension between the two liquids and between each liquid and the insulation layer 16 (having water repellency).

Because the absolute refractive indexes of the first liquid 8 and the second liquid 9 are different, light that has entered the liquid lens element 2 is refracted by a lens effect on the two-liquid interface 14a.

By applying a voltage from the external power source to the conductive layer 15 and the wiring 52 formed on the first substrate 4, charges are stored in the first liquid 8 and the conductive layer 15. When attraction among the charges occurs, the interfacial tension between the first liquid 8 and the insulation layer 16 (as the upper layer of the conductive layer 15) changes, with the result that the shape of the two-liquid interface 14a changes (electrowetting effect).

As described above, because the absolute refractive indexes of the first liquid 8 and the conductive layer 15 are different, optical characteristics different from those at a time when a voltage is not applied are exhibited. That is, it is possible to obtain the lens whose optical characteristics are changed by applying a voltage.

The fixing jig 3 according to this embodiment fixes or defines relative positions of the first substrate 4, the second substrate 5, and the third substrate 6 of the liquid lens element 2, and elastically deforms the sealing member 7, thereby hermetically sealing the liquid containing chamber 13 and thus preventing the liquid 14 contained in the liquid containing chamber 13 from leaking.

As shown in FIG. 2, the fixing jig 3 is constituted of the first member 17, the second member 18, and the bonding member 19.

The first member 17 presses the first substrate 4 toward the third substrate 6, and the second member 18 presses the second substrate 5 toward the third substrate 6.

The first member 17 includes a holding surface 17a that is in contact with the first substrate 4 and a bonded surface 17b that is engaged with the second member 18. The holding surface 17a has a hole 17c through which light that passes through the liquid lens element 2 passes. The first member 17 is made of a metal, a synthetic resin, or the like.

The second member 18 includes a holding surface 18a that is in contact with the second substrate 5 and a bonded surface 18b that is engaged with the first member 17. The holding surface 18a has a hole 18c through which light that passes through the liquid lens element 2 passes. The second member 18 is made of a metal, a synthetic resin, or the like.

The first member 17 and the second member 18 are formed so as not to interfere with each other in a state where the first and second members 17 and 18 are mounted on the liquid lens element 2. The fixing jig 3 according to this embodiment is formed so that the bonded surface 18b of the second member 18 is disposed between the liquid lens element 2 and the bonded surface 17b of the first member 17 with the fixing jig 3 being mounted on the liquid lens element 2. In addition, the fixing jig 3 is formed so that the first member 17 and the second member 18 can cover the outer circumference of the liquid lens element 2 (excluding the hole 17c and the hole 18c).

The first member 17 and the second member 18 are engaged with each other with the liquid lens element 2 being pressed (described later) so that the pressed state can be maintained. The pressed state is maintained by adhesive bonding, welding, screw clamping, or the like. The bonded surface 17b and the bonded surface 18b of the fixing jig 3 according to this embodiment are bonded to an entire outer circumferential surface of the liquid lens element 2. Therefore, a uniform engagement force is generated. As a result, the substrates of the liquid lens element 2 can be prevented from being deformed, and the liquid leakage and an influence on the optical characteristics due to the deformation of the substrates can be suppressed.

A method of manufacturing the liquid lens apparatus 1 according to this embodiment will be described.

FIG. 5 are schematic views each showing the method of manufacturing the liquid lens apparatus 1 according to this embodiment.

Figure 5A:
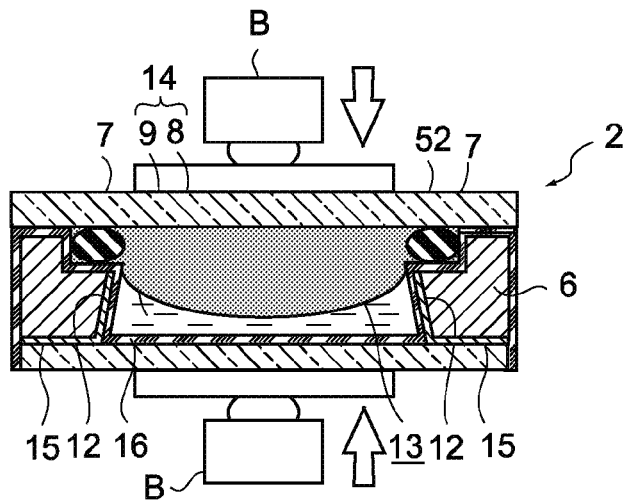
FIG. 5 are schematic diagrams each illustrating a method of assembling the liquid lens apparatus according to the first embodiment.

As shown in FIG. 5A, a pressing force is applied to the liquid lens element 2 by a pressing mechanism B. The pressing force is applied in a direction in which the first substrate 4 is pressed to the third substrate 6 and in a direction in which the second substrate 5 is pressed to the third substrate 6. When the liquid lens element 2 is pressed, the sealing member 7 is elastically deformed.

Figure 5B:
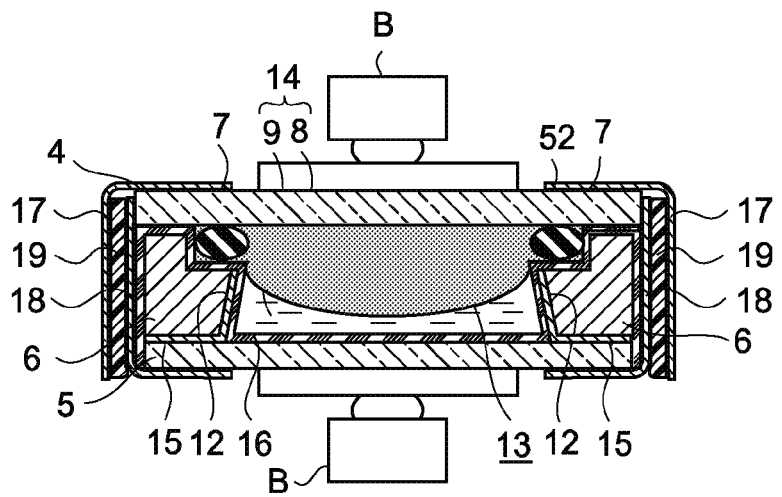

As shown in FIG. 5B, the first member 17 is disposed so that the holding surface 17a is in contact with the first substrate 4, and the second member 18 is disposed so that the holding surface 18a is in contact with the second substrate 5.

Figure 5C:
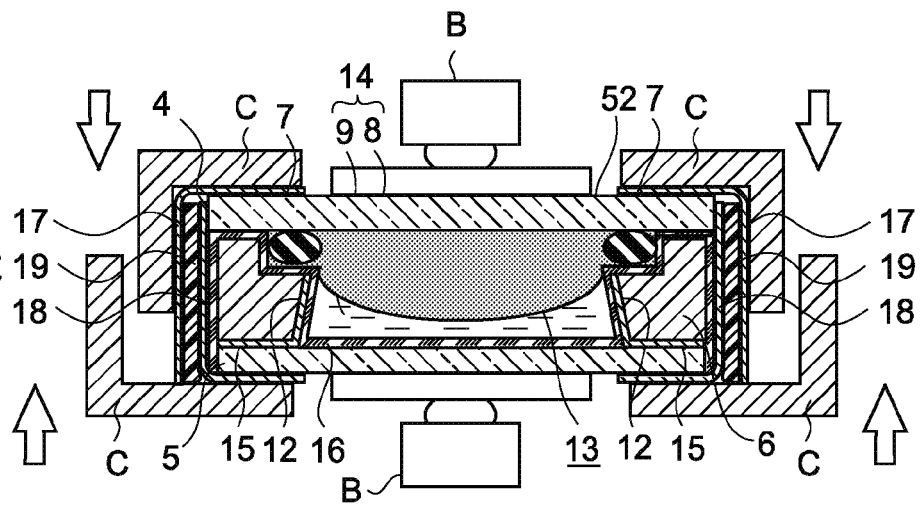

As shown in FIG. 5C, the first member 17 and the second member 18 are pressed toward the first substrate 4 and the second substrate 5, respectively, by a pressing mechanism C. The bonded surface 17b and the bonded surface 18b are bonded by the bonding member 19.

Until stable bonding of the bonded surfaces 17b and the 18b by the bonding member 19 is obtained, the pressing mechanism C keeps the pressing operation, with the result that the liquid lens apparatus 1 shown in FIG. 3 is formed. For example, in a case where a thermosetting resin, a UV curable resin, a pressure-sensitive adhesive, or the like is used for the bonding member 19, a curing processing of the adhesive is performed in the state shown in FIG. 5C. At a time when the curing processing of the adhesive is completed, the pressing operation by the pressing mechanism C is released. The adhesive may be applied on the bonded surface of the first or second member 17 or 18 in advance. Alternatively, after the first and second members 17 and 18 are engaged, the adhesive may be filled in an area between opposed bonded surfaces of the first and second members 17 and 18.

A description will be given on an operation of the liquid lens apparatus 1 structured as described above.

In the liquid lens apparatus 1 according to this embodiment, when the first member 17 of the fixing jig 3 presses the first substrate 4 against the third substrate 6 and the second member 18 of the fixing jig 3 presses the second substrate 5 against the third substrate 6, the sealing member 7 is deformed, and the liquid 14 is hermetically sealed by a reactive force thus generated. At this time, the liquid 14 is compressed, and therefore an inner pressure of the liquid 14 is varied.

That is, by the engagement force of the first member 17 and the second member 18 or an amount of deformation of the sealing member 7, the inner pressure of the liquid 14 and the sealing performance are adjusted at the same time.

Because the first member 17 and the second member 18 according to this embodiment can cover the outer circumference of the liquid lens element 2, it is possible to provide the fixing jig 3 with the sealing performance by using, as the bonding member 19, the member having the liquid sealing performance like the synthetic resin adhesive.

For example, if the sealing member 7 is damaged or deteriorated and the liquid 14 leaks from the liquid containing chamber 13, the fixing jig 3 functions as a backup sealing means. In other words, even if the function as the liquid lens is lost, it is prevented that the liquid 14 leaks to the outside of the liquid lens apparatus 1 and other structures including the wiring substrate are damaged.

In the liquid lens apparatus 1 according to this embodiment, the first substrate 4 and the third substrate 6 are fixed by the fixing jig 3. Therefore, the liquid lens element 2 can be structured without additionally providing a bonding layer between the substrates. With this structure, the thickness of the liquid lens element 2 can be reduced, with the result that the loss of a quantity of light that passes through the liquid lens element 2 can be reduced.

The inner pressure of the liquid 14 is defined, and therefore the liquid lens apparatus 1 according to this embodiment is hardly affected by a change in outer pressure such as an atmospheric pressure and a water pressure or a change in inner pressure due to a change in temperature.

A second embodiment will be described.

In the following description, descriptions on structures and functions that are the same as those of the liquid lens apparatus according to the first embodiment will be simplified or omitted, and different points will be mainly described.

Figure 6:
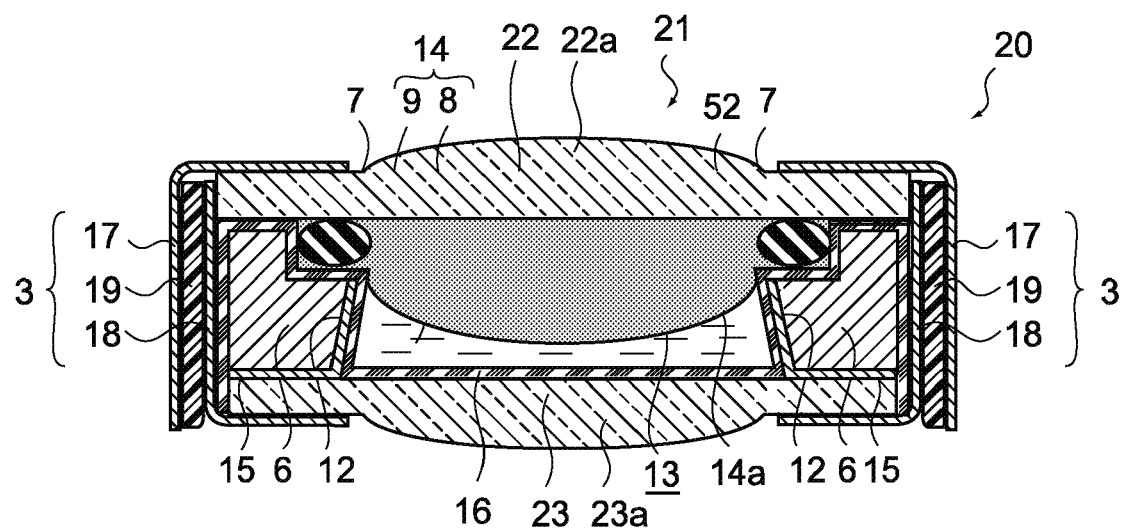
FIG. 6 is a cross-sectional view showing a liquid lens apparatus according to a second embodiment.

FIG. 6 is a cross-sectional view showing a liquid lens apparatus 20 according to this embodiment.

As shown in FIG. 6, a liquid lens element 21 of the liquid lens apparatus 20 according to this embodiment includes a first substrate 22 and a second substrate 23. On the first substrate 22, a three-dimensional structure 22a is formed. On the second substrate 23, a three-dimensional structure 23a is formed. It should be noted that the three-dimensional structure may be formed on at least one of the first substrate 22 and the second substrate 23.

The three-dimensional structures 22a and 23a can have an optical function or a physical function such as a function of enhancing a mechanical strength. For example, the shape of each of the three-dimensional structures is not limited to a convex lens shape as shown in FIG. 6, and may instead be a three-dimensional configuration so as to function as a Fresnel lens, a micro lens array, or a prism lens. In addition, by extending thicknesses of the three-dimensional structures 22a and 23a so as to fit into the hole 17c of the first member 17 and the hole 18c of the second member 18, respectively, the strength of the liquid lens element 21 can be improved without increasing the thickness of the liquid lens apparatus 20.

A third embodiment will be described.

Figure 7:
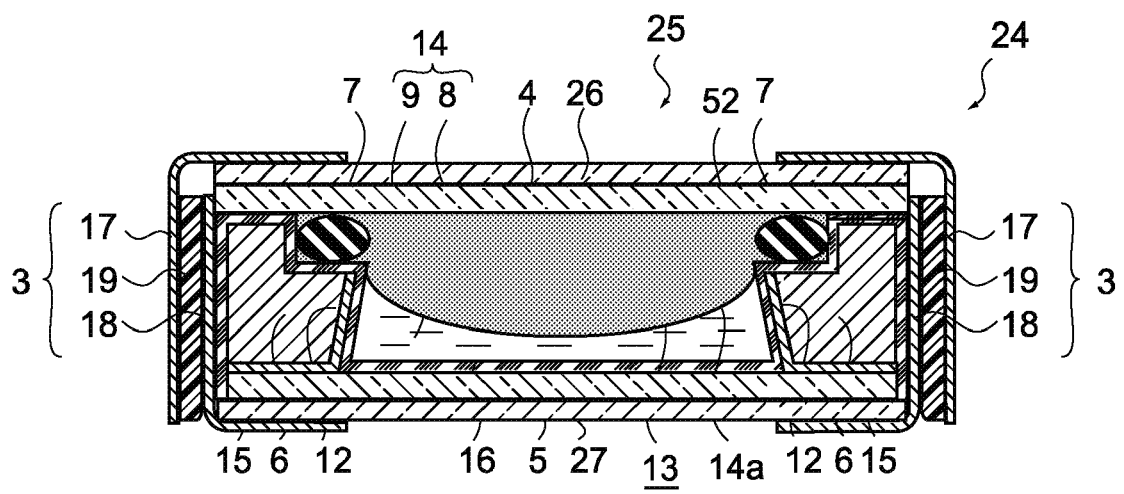
FIG. 7 is a cross-sectional view showing a liquid lens apparatus according to a third embodiment.

FIG. 7 is a cross-sectional view of a liquid lens apparatus 24 according to this embodiment.

As shown in FIG. 7, a liquid lens element 25 of the liquid lens apparatus 24 according to this embodiment includes a function adding member 26 and a function adding member 27.

The function adding member 26 is disposed between the first substrate 4 and the first member 17, and the function adding member 27 is disposed between the second substrate 5 and the second member 18. It should be noted that the function adding member may be disposed in at least one of a gap between the first substrate 4 and the first member 17 and a gap between the second substrate 5 and the second member 18, and the number of function adding members may be changed as needed.

For each of the function adding member 26 and the function adding member 27, a functional member having an optical function or a physical function such as a function of enhancing the mechanical strength, for example, an optical sheet or a reinforcing sheet can be used.

By disposing the function adding member 26 and the function adding member 27 on outer sides of the first substrate 4 and the second substrate 5, respectively, it is possible to provide a light-collecting function or a polarizing function in addition to the varifocal function of the liquid lens element. Further, it is also possible to improve durability (sealing performance for the liquid 14) with respect to an impact given from the outside of the liquid lens apparatus 24 (through the hole 17c or the hole 18c). In addition, the function adding members 26 and 27 can be formed integrally with the liquid lens element by using the fixing jig 3. Therefore, it is possible to easily assemble components and improve assembly performance to the apparatus.

A fourth embodiment will be described.

Figure 8:
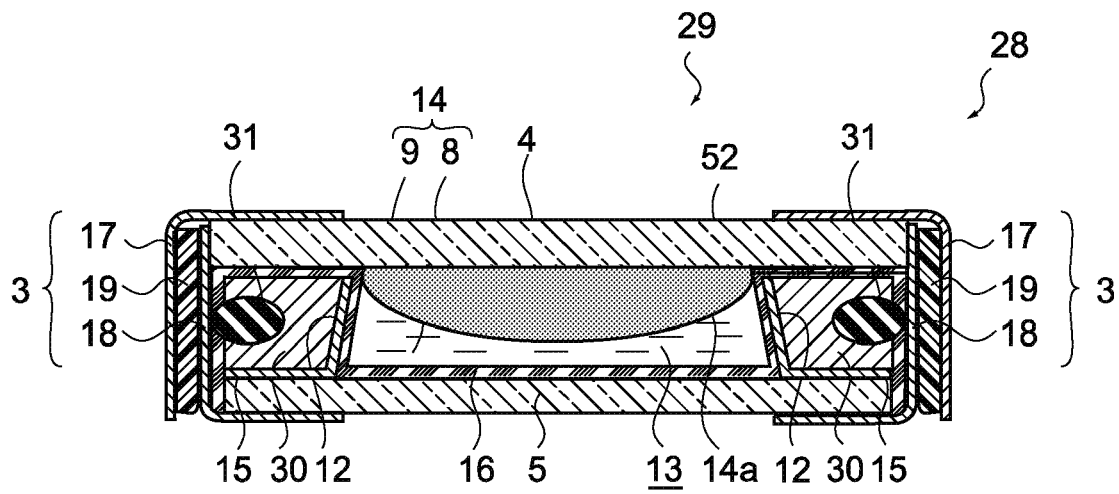
FIG. 8 is a cross-sectional view showing a liquid lens apparatus according to a fourth embodiment.

FIG. 8 is a cross-sectional view showing a liquid lens apparatus 28 according to this embodiment.

As shown in FIG. 8, a liquid lens element 29 of the liquid lens apparatus 28 according to this embodiment includes an annular sealing member 31 disposed on an outer circumferential portion of a third substrate 30.

By disposing the sealing member 31 on the outer circumferential portion of the substrate 30, a compression force for hermetic seal is applied on a side surface of the substrate 30. The compression force can be adjusted depending on the size of the second member 18, and the inner pressure of the liquid 14 can be adjusted depending on the engagement force of the first member 17 with the second member 18. That is, the inner pressure of the liquid 14 and the compression force to the sealing member 31 can be adjusted independently of each other.

When necessary, in order to further improve the sealing performance, a sealing layer may be formed between the first substrate 4 and the third substrate 30 or between the first substrate 4 and the first member 17 of the fixing jig 3.

A fifth embodiment will be described.

Figure 9:
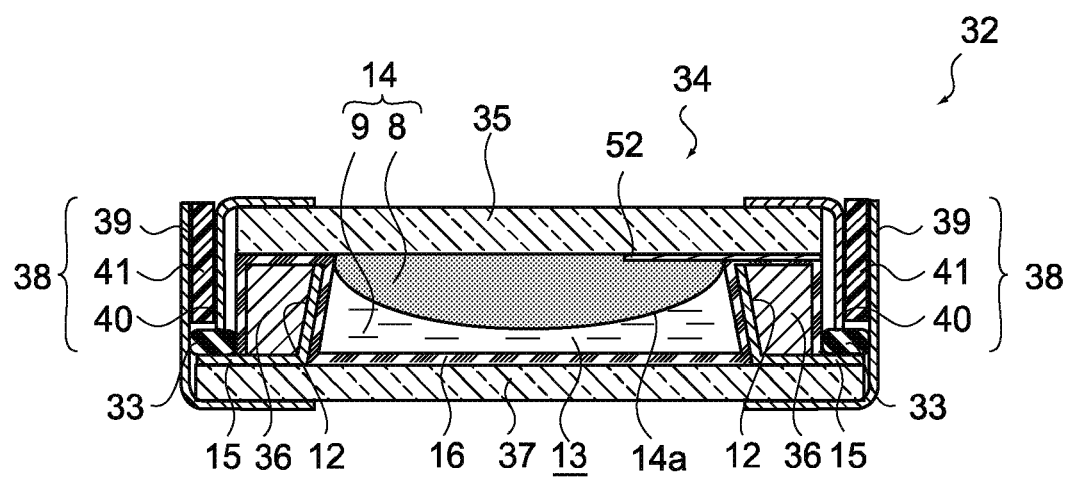
FIG. 9 is a cross-sectional view showing a liquid lens apparatus according to a fifth embodiment.

FIG. 9 is a cross-sectional view showing a liquid lens apparatus 32 according to this embodiment.

As shown in FIG. 9, a sealing member 33 of the liquid lens apparatus 32 according to this embodiment is annularly formed and disposed outside a liquid lens element 34.

The liquid lens apparatus 32 according to this embodiment includes a second substrate 37 having a larger area than a third substrate 36 and a first substrate 35. The sealing member 33 can be disposed on the second substrate 37 and can be adjacent to the third substrate 36.

A fixing jig 38 according to this embodiment includes a first member 39 and a second member 40. The first member 39 and the second substrate 37 applies a pressure to the sealing member 33, and the first member 39 and the second member 40 are bonded by a bonding member 41, with the result that the liquid 14 of the liquid lens element 34 can be sealed. The sealing member 33 is disposed outside the liquid lens element 34, and therefore the liquid lens element 34 has a simple structure.

A sixth embodiment will be described.

Figure 10:
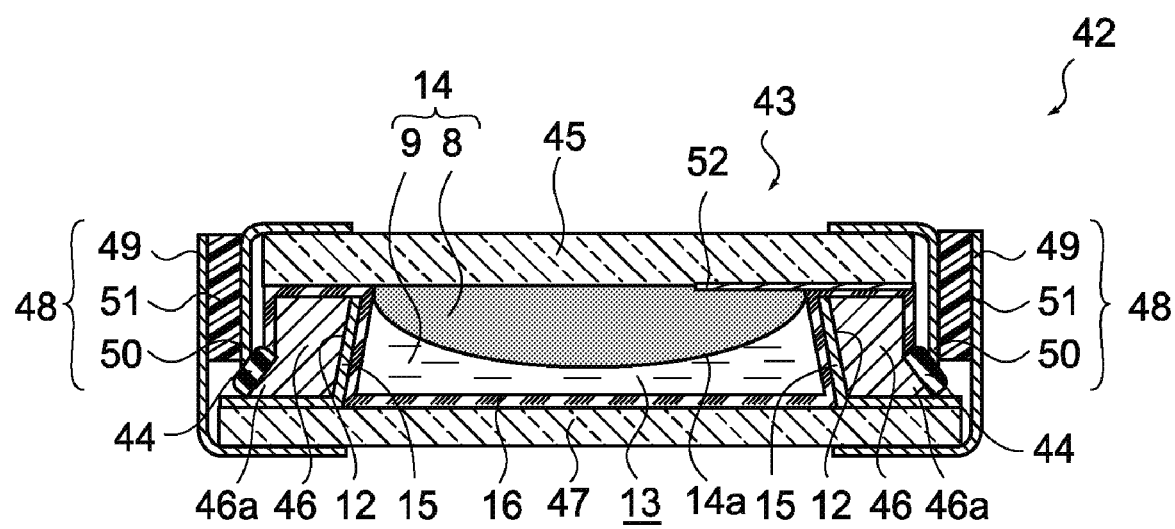
FIG. 10 is a cross-sectional view showing a liquid lens apparatus according to a sixth embodiment.

FIG. 10 is a cross-sectional view of a liquid lens apparatus 42 according to this embodiment.

As shown in FIG. 10, a sealing member 44 of a liquid lens element 43 according to this embodiment is disposed at a position as in the liquid lens apparatus 32 according to the fifth embodiment.

The liquid lens apparatus 42 according to this embodiment includes a second substrate 47 having a larger area than a third substrate 46 and a first substrate 45. The sealing member 44 can be disposed on the second substrate 47 and can be adjacent to the third substrate 46. The third substrate 46 has an incline portion 46a on a side of the second substrate 47 thereof. The incline portion 46a supports the sealing member 44 and is inclined toward the second substrate 47.

A fixing jig 48 according to this embodiment has a first member 49 and a second member 50. The first member 49 and the second substrate 47 press the sealing member 44, and the first member 49 and the second member 50 are bonded by a bonding member 51, with the result that the liquid 14 of the liquid lens element 43 can be sealed.

By adjusting an inclination angle of the incline portion 46a, the inner pressure of the liquid 14 and the compression force to the sealing member 44 can be appropriately set.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. A liquid lens apparatus, comprising:
a liquid lens element including a main body, a lens surface, and a sealing portion, the main body including a first substrate, a second substrate, and a third substrate that is disposed between the first substrate and the second substrate and forms a liquid chamber, the lens surface being formed of an interface between two liquids which are contained in the liquid chamber and have different refractive indexes and being capable of being electrically deformed, the sealing portion hermetically sealing the main body; and
a fixing jig that is engaged with the first substrate and the second substrate, the first substrate and the second substrate sandwiching the third substrate, the fixing jig including a first member and a second member, a portion of the second member being inserted into a portion of the first member,
wherein the first member includes a first bonded surface and the second member includes a second bonded surface on the portion of the second member that is inserted into the portion of the first member, and the first bonded surface is bonded to the second bonded surface.

2. The liquid lens apparatus according to claim 1, wherein the fixing jig adjusts an inner pressure of the liquid chamber by using an engagement force with respect to the first substrate and the second substrate.

3. The liquid lens apparatus according to claim 2, wherein the first member includes a first holding surface that is in contact with the first substrate,
the second member includes a second holding surface that is in contact with the second substrate, and the fixing jig further comprises
a bonding means for bonding the first bonded surface and the second bonded surface with each other.

4. The liquid lens apparatus according to claim 3, wherein the sealing portion is disposed in at least one of a gap between the first substrate and the third substrate and a gap between the second substrate and the third substrate.

5. The liquid lens apparatus according to claim 4, further comprising:
a reinforcing member that is disposed in at least one of a gap between the first substrate and the first member and a gap between the second substrate and the second member, and reinforces one of the first substrate and the second substrate.

6. The liquid lens apparatus according to claim 4, further comprising:
an optical member having an optical characteristic, the optical member being disposed in at least one of a gap between the first substrate and the first member and a gap between the second substrate and the second member.

7. The liquid lens apparatus according to claim 3, wherein the sealing portion is disposed between the liquid lens element and the fixing jig.

8. The liquid lens apparatus according to claim 7, wherein the sealing portion is disposed on an outer circumference of the third substrate.

9. The liquid lens apparatus according to claim 8, wherein the sealing portion is disposed between the first member and the second member.

10. The liquid lens apparatus according to claim 1, wherein the first substrate includes a surface having a three-dimensional structure.

11. The liquid lens apparatus according to claim 1, wherein the first member presses the first substrate toward the third substrate, and the second member presses the second substrate toward the third substrate.

12. The liquid lens apparatus according to claim 1, wherein the second bonded surface of the second member is disposed between the liquid lens element and the first bonded surface of the first member when the fixing jig is mounted on the liquid lens element.

13. The liquid lens apparatus according to claim 1, wherein the fixing jig is configured to apply an at least substantially uniform engagement force with respect to the first substrate and the second substrate.

14. The liquid lens apparatus according to claim 1, wherein the sealing portion is configured as a primary sealing means of the liquid lens element, and the combination of the first member bonded to the second member is configured as a secondary sealing means of the liquid lens element.

15. The liquid lens apparatus according to claim 10, wherein the three dimensional structure is selected from the group consisting of a convex lens, a Fresnel lens, a microlens array, and a prism lens.

16. The liquid lens apparatus according to claim 1, wherein the second substrate has a larger area than the first substrate and the third substrate.

17. The liquid lens apparatus according to claim 16, wherein the sealing portion is disposed outside the liquid lens element.

18. The liquid lens apparatus according to claim 1, wherein the third substrate has an inclined outer portion, the inclined outer portion being adjacent to the second substrate.

19. The liquid lens apparatus according to claim 18, wherein the sealing portion is supported by the inclined outer portion of the third substrate.

20. A method of manufacturing a liquid lens apparatus, the method comprising:
producing a liquid lens element including a main body and a lens surface, the main body including a first substrate, a second substrate, and a third substrate that is disposed between the first substrate and the second substrate and forms a liquid chamber, the lens surface being formed of an interface between two liquids which are contained in the liquid chamber and have different refractive indexes and being capable of being electrically deformed; and
sandwiching a circumference of the liquid lens element by a fixing jig to hermetically seal the liquid lens element, and determining an inner pressure thereof, the fixing jig including a first member and a second member, a portion of the second member being inserted into a portion of the first member,
wherein the first member includes a first bonded surface and the second member includes a second bonded surface on the portion of the second member that is inserted into the portion of the first member, and the first bonded surface is bonded to the second bonded surface.

* * * * *